United States Patent [19]

Eyben et al.

[11] Patent Number: 4,816,147

[45] Date of Patent: Mar. 28, 1989

[54] FILTER PRESS-TYPE FILTERING APPARATUS USING RIGID FILTER ELEMENT

[75] Inventors: Donald Eyben, Kessel-Lo; Jacques Meurens, Visé; Jacques Hermia, Walhain; Georges Rahier, Liége, all of Belgium

[73] Assignees: Brasserie Piedboeuf, Liege; Societé belge de Filtration, Louvain-la-Neuve, both of Belgium

[21] Appl. No.: 180,639

[22] Filed: Apr. 6, 1988

Related U.S. Application Data

[63] Continuation of Ser. No. 876,797, Jun. 20, 1986, abandoned.

[30] Foreign Application Priority Data

Jul. 2, 1985 [LU] Luxembourg ............................ 85987
Oct. 7, 1985 [LU] Luxembourg ............................ 86109

[51] Int. Cl.⁴ ........................ B01D 25/08; B01D 25/12
[52] U.S. Cl. ................................ 210/225; 100/115; 100/197; 100/211; 100/295; 210/228; 210/231
[58] Field of Search ............... 210/224, 225, 226, 227, 210/228, 229, 230, 231, 770, 772, 782; 100/113, 115, 196, 198, 211, 197, 295

[56] References Cited

U.S. PATENT DOCUMENTS

| | | | |
|---|---|---|---|
| 1,138,251 | 5/1915 | Schaefer | 210/228 |
| 1,193,779 | 8/1916 | Guerrero | 210/231 |
| 3,015,395 | 1/1962 | Stram et al. | 210/231 X |
| 3,073,238 | 1/1963 | Vitali | 100/115 |
| 3,270,887 | 9/1966 | Juhasz et al. | 100/211 X |
| 3,347,383 | 10/1967 | Augerot | 210/225 |
| 3,347,384 | 10/1967 | Müller | 210/225 |
| 3,926,811 | 12/1975 | Ramsteck | 210/231 |
| 3,941,703 | 3/1976 | Binard | 210/499 |
| 4,066,202 | 1/1978 | Binard | 228/173 E |
| 4,166,035 | 8/1979 | Ramsteck | 210/231 |
| 4,346,003 | 8/1982 | Polyakov et al. | 210/225 |
| 4,397,744 | 8/1983 | Harno | 100/198 X |

FOREIGN PATENT DOCUMENTS

| | | |
|---|---|---|
| 52174 | 9/1984 | European Pat. Off. |
| 162998 | 12/1985 | European Pat. Off. |
| 81715 | 7/1986 | European Pat. Off. |
| 2251265 | 3/1974 | Fed. Rep. of Germany |
| 2633372 | 1/1978 | Fed. Rep. of Germany |
| 2088713 | 1/1972 | France |
| 2292508 | 6/1976 | France |
| 2384526 | 10/1978 | France |
| 2506217 | 11/1982 | France |
| 1506134 | 4/1978 | United Kingdom |

OTHER PUBLICATIONS

"Filterapparate", by S. Werner et al., in *Chemie Ingenieur Technik*, vol. 36, No. 12, Dec. 1964, pp. 1287–1288.

LAROX PF Automatic Pressure Filter Brochure by LAROX OY, Lappeenraanta, Finland, (Nov. 1983).

*Primary Examiner*—W. Gary Jones
*Attorney, Agent, or Firm*—Watson, Cole, Grindle & Watson

[57] ABSTRACT

There is disclosed a filtering method comprising using a filter-press-type device in the chambers whereof filtering means divide a compartment for material to be filtered from a filtrate-collecting compartment, compressing the possibly-washed material to be filtered by reducing the volume of the compartments for material to be filtered, discharging washing solute and filtrate which have passed through the filtering means, and dismantling said filter-press. The method makes use of filter means which are resistant and undistortable under the method conditions, and retains the filtering means in a relative position to the filtering chamber axis which is identical during all the filtering steps.

13 Claims, 5 Drawing Sheets

FILTER PRESS-TYPE FILTERING APPARATUS USING RIGID FILTER ELEMENT

This application is a continuation, of application Ser. No. 876,797, filed June 20, 1986, now abandoned.

BACKGROUND OF THE INVENTION

FIELD OF THE INVENTION

This invention relates to a filtering method, notably a method for filtering brewery wort, comprising (a) providing a filter-press-type filtering device having assembled plates and possibly frames forming together filtering chambers, each filtering chamber including filtering means which divides the filtering chamber into a compartment for material to be filtered and a compartment for collecting filtrate and possibly washing solute, (b) feeding material to be filtered to each of compartments for material to be filtered, (c) possibly washing the material, (d) compressing the possibly-washed material to be filtered by reducing the volume of the compartment for material to be filtered, (e) discharging the washing solute and filtrate which have passed through the filtering means, (f) dismantling the filter-press, and (g) discharging the filter cake from the filter-press.

The invention further pertains to a filter-press-type filtering device, notably for filtering brewery wort, comprising (a) assembled plates and possibly frames forming together filtering chambers, (b) at least one inlet to each filtering chamber for feeding material to be filtered, (c) filtering means dividing each filtering chamber into a compartment for material to be filtered and a compartment for collecting the filtrate and possibly washing solute, (d) at least one outlet for the filtrate and washing solute,(e) means for reducing the volume of the compartment for material to be filtered so as to compress the material to be filtered after forming the filter cake, and (f) means for discharging the filter cake obtained after compressing from the filter press.

THE PRIOR ART

Filter-presses of the above-defined type are already known. So-called honeycombed plate or tray filter-presses (see, for instance FR-A-2384526, FR-A-2398529, U.S. Pat. No. 3,926,811, and EP-A-81715) are known. In such filter-presses, each filtering chamber is formed by two assembled filtering plates, each plate having a peripheral frame and two front walls, at least one wall being a flexible diaphragm. Each flexible diaphragm bears a filtering means in the shape of a filtering towel or cloth movable together with the diaphragm, the filtrate-collecting compartment being formed between the filtering cloth and a shaping provided in the flexible diaphragm to drain the filtered liquid. The compartment for material to be filtered is formed between two opposite filtering towels or cloths, or between such a towel or cloth and a fixed wall. The flexible diaphragms are partly movable towards the compartment for material to be filtered under the action of a pressurized fluid, thus forming a means for reducing the compartment. The diaphragms are secured to the frame at the circumference thereof, and in the case where feeding occurs in the center, also to the feed line. The front walls, which are costly as they require a very complex machining to be efficient, show a very fast ageing under the conditions they are subjected to. Moreover, such walls do not generally allow but a quite insufficient axial movement in some areas such as brewery, for example, where the thickness of the compartments for material to be filtered should advantageously lie in the range from 30 to 80 mm. The filter cake as obtained in the filtering chambers may easily cling to the filtering cloths, which are also made from distortable material. Finally, complex and costly devices for separating the filter cake after dismantling the filter-press are often required.

Filter-presses are also known wherein each compartment for material to be filtered is formed between, on the one hand, a flexible diaphragm, and, on the other hand, a filtering cloth or towel. Same does bear on a rigid fluted plate and forms therewith the filtrate-collecting compartment (for example the filter-press LA-ROX®CF). The filtering cloth or towel should be stretched to remove the filter cake from the plate, then it is unwound outwardly to allow taking same away, which requires complex and costly equipment. Finally, as in the known above-described devices, the filtering cloths are made from a distortable material, for example, a textile material, and under the conditions they are subjected to, they wear fast and have to be replaced often.

Filter-presses are also known wherein each compartment for material to be filtered is formed by a filtering bag from distortable material, each filtrate-collecting compartment being formed between the one bag side and a rigid plate. The plates are so arranged relative to one another as to be pressable towards one another under the action of high-power hydraulic jacks (see FR-A-2506217).

There is finally known, particularly for filtering brewery wort, filter-presses of the conventional type, that is, which allow but a filtering without compressing step (see for instance BE-A-844362 and BE-A-886465). Such filter-presses may comprise, to form the filtering chambers, empty frames sandwiched between those plates bearing the filtering means. Such means will always be filtering towels or cloths which may possibly be supported on wide-mesh metal screens used as filtering-means supporting means. The devices naturally have a much lower efficiency due to the lack of compressing the filter cake.

It is known on the other hand to manufacture rigid screens from wires (see instance BE-A-838396 and FR-A-2292508) and to use them in filters, for example strainer-type filters (see for instance BE-A-838396 and FR-A-2088713), or as filtering-fabric supports (see, for instance, DE-A-2633372).

SUMMARY OF THE INVENTION

This invention has for its object to obviate the problems raised by the known devices and to provide a filtering method and device which are simple, unexpensive and very strong, and which can be used even in those cases where the filtering chambers must have large thicknesses, as is the case when filtering brewery wort.

This problem is solved according to the invention with a method comprising using strong and undistortable filtering means under the method conditions, and retaining the filtering means in a position relative to the filtering chamber axis which is the same during all the filtering steps.

In an advantageous embodiment of the invention, the method comprises retaining filtering means in a fixed position down to the dismantling, moving at least one other element forming each compartment for the material to be filtered in the direction of the corresponding filtering means to reduce the compartment volume, spreading the filtering means and the other elements forming the compartment for material to be filtered with a view to dismantling, such spreading comprising a traversing motion of the filtering means along the device axis, and discharging the filter cake, which is possibly still retained within the compartments.

In another embodiment of the invention, the method comprises, in order to reduce the volume of the compartments for material to be filtered, displacing with a traversing motion filtering means along the filtering chamber axis, in the direction of the corresponding compartment thereof for material to be filtered, opening the compartments when dismantling, and discharging the filter cake, which is possibly still retained within the compartments.

There is further provided, according to the invention, a device as described at the start, wherein each chamber comprises as filtering means a strong filtering medium which is undistortable under the device operating conditions, and which has a relative position with respect to the filtering chamber axis which is the same in every position of the filtering means during all the filtering steps. Advantageously, each filtering chamber comprises as filtering means, a filtering medium such as a screen, a netting, a cloth, a perforated plate or similar medium from hard material, notably metal material, which has on the side of the compartment for material to be filtered, besides liquid-passage openings, a smooth and flat surface.

In an improved embodiment of the invention, each compartment for material to be filtered is bounded in front between a filtering means and a volume-reducing means for the compartment for material to be filtered.

In another embodiment of the invention, each compartment for material to be filtered is bounded in front between one the filtering means, serving simultaneously as volume-reducing means for the compartment, and another filtering means, or respectively a rigid front partition or wall.

Other details and features of the invention will stand out from the following description, given by way of non limiting examples and with reference to the accompanying drawings.

DETAILED DESCRIPTION OF THE PREFERRED EMBODIMENTS

In the various drawings, the same reference numerals pertain to identical or similar elements.

Figure 1:
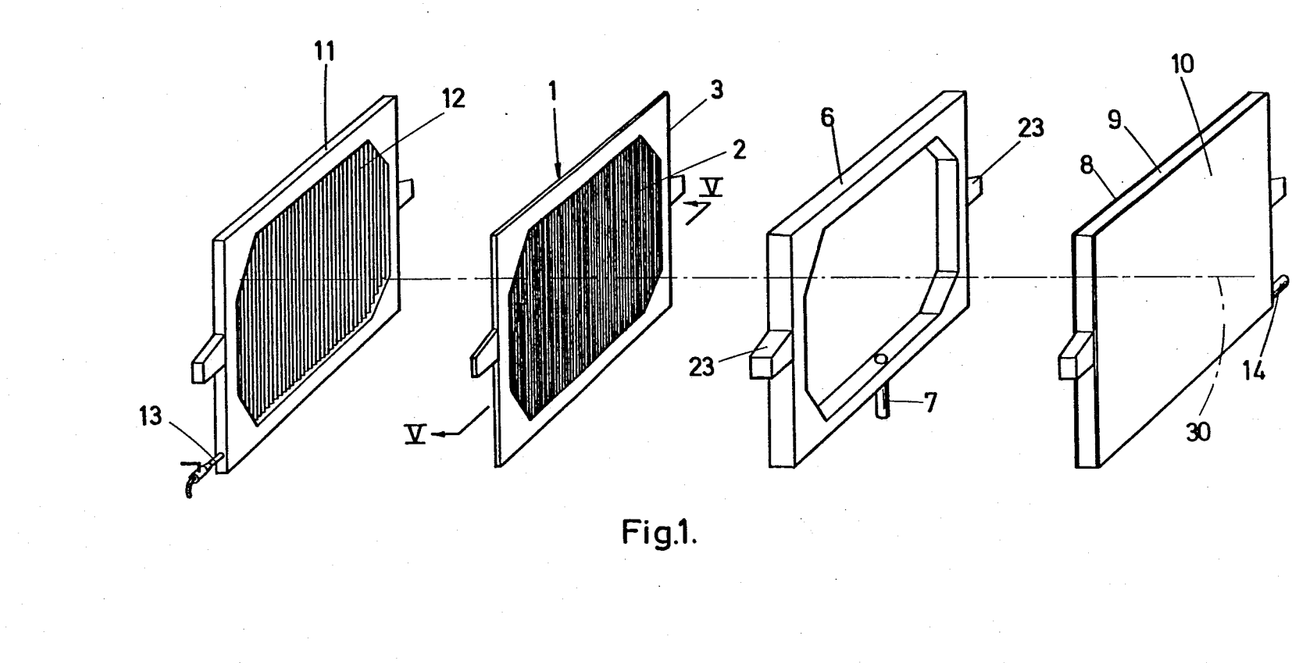
FIG. 1 is an exploded (dismantled) diagrammatic perspective view of the frames and plates which form a filtering chamber in a filter-press according to one embodiment of the invention, the guides and holders for the frames and plates not being shown.
Figure 2:
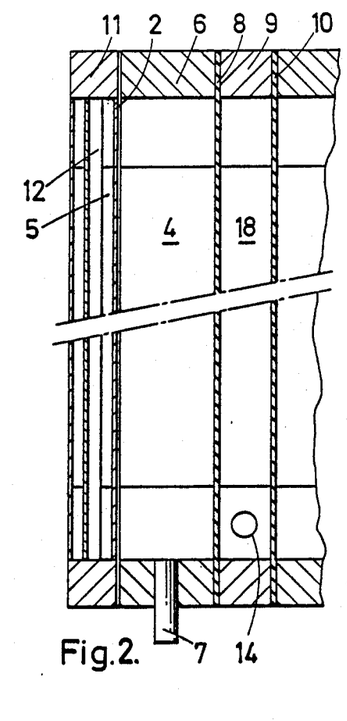
FIG. 2 is another axial section view of an embodiment of the invention when, in an assembled condition and at a time prior to compressing.

As appears from FIG. 1, each filtering chamber in the filter-press comprises a filtering means 1 which is undistortable under the filter-press operating conditions, for example, comprising a metal netting 2 supported on a frame 3, the filtering means dividing the filtering chamber into a compartment 4 for material to be filtered (see FIG. 2), and a compartment 5 for collecting the filtrate or washing solute (see FIG. 2).

The compartment 4 for material to be filtered is formed in the embodiment shown in FIG. 1 between the metal netting 2, a discrete empty frame 6, which includes a feed line 7 for the material to be filtered, and a resilient diaphragm 8 in the shape of a simple sheet, for example, from food-quality natural rubber, which is secured to a holding frame 9. The holding frame 9 in the embodiment shown in FIG. 1 is closed on the opposite front side thereof by a second diaphragm 10, which is used in the adjacent filtering chamber. In the chamber 18 (see FIG. 2) formed between diaphragms 8 and 10 and the supporting frame 9 thereof, there opens a pressurized-fluid supply line 14, for example for pressurized air.

The filtrate-collecting chamber 5 is enclosed in the embodiment shown in FIG. 1 between metal netting 2 and a plate or tray comprising a frame 11 closed by a partition 12 lying a short distance away from the front side of frame 11 and preferably shaped with grooves, for example, to drain the filtered liquid downwards where it is collected, as known per se, inside frame 11. The filtered liquid is discharged through outlet line 13.

It can be seen that each of the frames 3, 6, 9 and 11 is provided with two side projections 23 for the support thereof on known holdng and guiding means, not shown. Moreover, when dismantling, that is in the position as shown in FIG. 1, all the frames which are simply applied against one another during the filter-press operation may be separated from one another.

Figure 3:
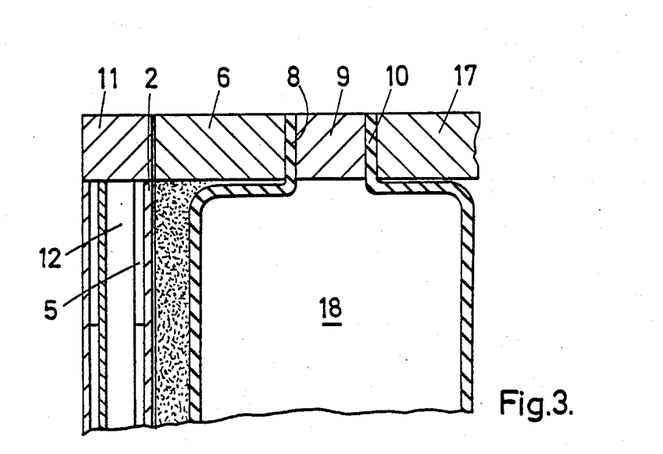
FIG. 3 is a part sectional view similar to FIG. 2 during a compressing step.
Figure 4:
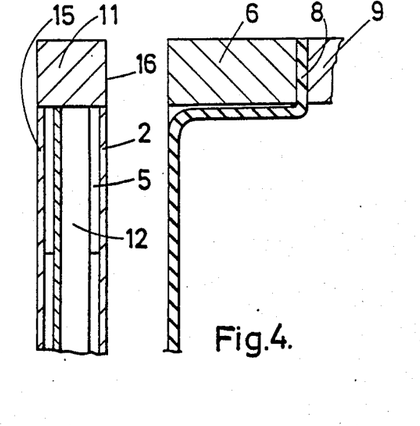
FIG. 4 is a part section view similar to FIGS. 2 and 3 during a filtering cake removing step.

In FIGS. 2 to 4 another embodiment of the invention is shown, which differs mostly from the previous embodiment in that the filtering means 2 is secured directly on frame 11 and that the frame 6 is integral with frame 9 during all the operations, including dismantling. In this regard, frames 6 and 9 can be one part, or they may be connected by bolts, but with a possibility that they can be separated when required, for instance, when diaphragm 8 must be be reached.

As can be seen in FIGS. 2 to 4, the partition 12 between two filtering chambers is comprised of a rigid material structure, for example, a stainless steel sheet. The sheet is secured inside frame 11 to divide same axially in two. The metal netting is secured to frame 11 at one front end thereof to be flush with the front side 16 (see FIG. 4). In the same way, at the other front end thereof, the filtering means 15 from the adjacent filtering chamber is secured in an identical way.

As can be seen in FIGS. 2 to 4, frame 9 is integral with empty frame 6, the flexible diaphragm 8 being clamped between both frames. In the same way, diaphgram 10 is clamped between frame 9 and empty frame 17 from the adjacent filtering chamber. Therebetween a pressurized fluid chamber 18 is formed inside frame 9. The chamber 18 might of course also be divided in two, either by a tight partition, or by a partition for preventing the diaphragms from flapping. The diaphragms are used as means for reducing the volume of the compartments for material to be filtered when the diaphgrams are inflated by emitting pressurized fluid in chamber 18. They may also serve, as seen hereinafter, as means for discharging the filter cake from the filter-press.

Figure 5:
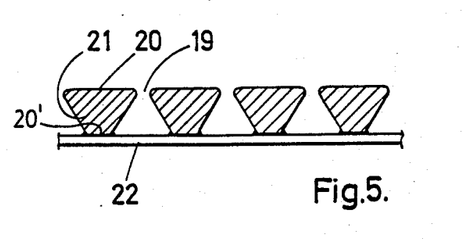
FIG. 5 is a part section view of a filtering means according to the invention, as seen along line V—V in FIG. 1.

The diaphragms in the devices according to the invention may be simple, very flexible rubber sheets, for example, natural food-quality rubber, to be extendable without problem under the action of the pressurized fluid along the axial direction over a distance in the range from 30 to 80 mm. The material being used is thus cheap; it does not require any specific machining to obtain a particular shape or perforations, and the diaphragms may easily be secured to frame 9, for example, by glueing to the front surfaces thereof. They may also easily be replaced, even in the case as shown in FIG. 2 where it is only necessary to unbolt both frames 6 and 9 and to remove the diaphragm 8 clamped therebetween. Such replacement thus does not require in any way replacing the whole diaphragm-holding frame, as has been the case in known devices. In the devices according to the invention, there is provided a filtering medium which is strong and undistortable under filtering and compressing conditions and which has a relative position to axis 30 (see FIG. 1) of the filtering chambers which is identical in every position of the filtering means, at least during all those filtering steps previous to discharging the filter cake. Advantageously the filtering medium has on the side of the compartment for material to be filtered, besides passage openings 19 for the filtrate, a smooth and flat surface 20. A non limitative embodiment of such a filtering medium is shown in FIG. 5. The medium is comprised of a stainless steel netting in two layers, the wires 21 from the compartment for material to be filtered lying substantially in parallel relationship to one another with a spacing lying between 50 and 400 microns. The surfaces 20 between the resulting passage openings 19 are flattened and so arranged as to form a single plane. The wires are retained together by underlying cross-wise wires 22, which are welded to the rear surfaces 20' thereof and lie with a larger spacing from one another. The passage openings 19 grow larger in the direction of the filtrate-collecting compartment. This allows those particles with a size larger than the passage openings to be retained on the surface and to prevent the particles passing therethrough from choking same. As nettings of this kind, there is known a netting sold by the firm BEKAERT under the name Trislot ® and which has notably been described as already stated, in BE-A-838396, FR-A-2292508, FR-A-2088713, and DE-A-2633372. Use is thus made in the filter-presses according to the invention of filtering means which are very resistant to the filtering and compressing conditions and which do not undergo any distortion when being used. They must substantially never be replaced, which avoids the costs for often replacing filtering towels or cloths in the known devices. The filter cake hardly adheres to the surface thereof, which makes it easier to dismantle and discharge the filter cake. It is to be noted that during the dismantling, the filter means is separated from the other elements by a simple traversing.

The operation of the device according to the invention shown in FIGS. 2 to 4 will now be described with more detail:

In FIG. 2, the frames and plates from the filter-press have just been assembled and pressed together in a known way, not shown. The material to be filtered is then fed through line 7 to empty frame 6 under some pressure and into compartment 4. Filtering then occurs through netting 2, the liquid phase flowing therethrough and being collected in collecting chamber 5 and then discharged through outlet line 13. The solid phase, on the other hand, is retained by netting 2. In the brewery area, it is desirable that compartment 4 have some thickness, preferably up to 80 mm. Indeed it is better when a small thickness solid material has time to settle against the netting to let filtering be completely efficient.

Thereafter, washing water is fed in the apparatus, for example, through that same line 7, and the washing solute which passes through netting 2 is collected in collecting chamber 5 where it is drained downwards by partition 12 and discharged through outlet line 13.

When an optimum amount of solute has been collected, the cake pressing may occur (see FIG. 3). Such compressing is caused by inflating the resilient diaphragm by supplying pressurized fluid to chamber 18. During such inflating, the diaphragm distorts and moves towards filtering netting 2, which results in reducing the solid material compartment volume and pressing the solid phase against filtering netting 2. Due to the high flexibility thereof, the diaphragm follows very well the inner periphery of empty frame 6. During this step, line 7 is closed and a compressed cake, as shown in dotted lines in FIG. 3, is formed between the diaphragm and the netting.

There is shown in FIG. 4 the dismantling of the filter-press. During this step, spacing is obtained by axial traversing between the filtering netting and the other elements comprising the compartment for material to be filtered, that is empty frame 6 and diaphragm 8. Thus there is no distortion of the elements during dismantling, or loosening between same due to stripping as this is the case in known devices making use of filtering cloths.

In the embodiment shown in FIGS. 2 to 4, discharging the filter cake may occur by an additional inflating of diaphragm 8, as shown in FIG. 4, the diaphragm pushing the filter cake out of frame 4. The cake then falls into a hopper, now shown.

In the embodiment as shown in FIG. 1, when dismantling, its metal netting 2 supported on the own frame 3 and empty frame 6 are separated from the other frames 11 and 9. The frame 6 is then set at some angle, or subjected to an impact or vibrations, and the filter cake falls into a hopper, not shown.

Figure 6:
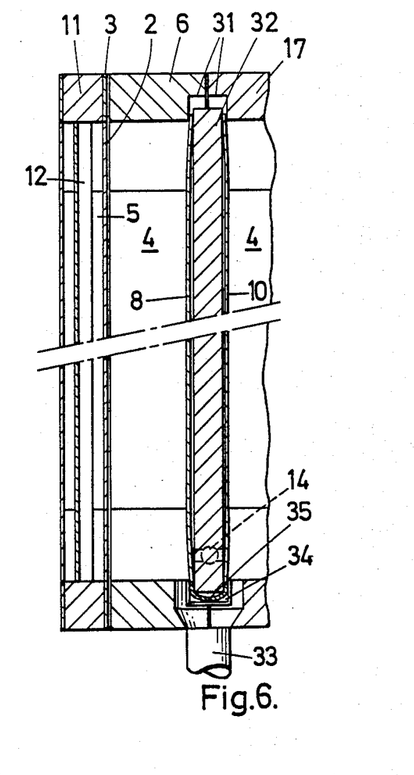
FIG. 6 is an axial section view of another embodiment of the invention when, in an assembled condition and at a time prior to compressing.

The device as shown in FIG. 6 is very similar to the above-described devices. The main difference lies in the fact that empty frames 6, 17 have an inner peripheral notch 31 in one edge thereof. Two empty frames 6, 17 from two adjacent filtering chambers are arranged with the respective notches thereof facing one another and thus, when assembled forming a peripheral groove. A partition or supporting plate 32 is positioned in the groove which divides both filtering chambers and bears on each side thereof, a diaphragm 8, 10 from natural rubber, which is secured along the circumference thereof. The peripheral groove thus forms a volume between both frames 6, 17 wherein are confined the resilient diaphragms 8, 10 and the rigid supporting plate 32. The rigid supporting plate prevents an unsuitable movement of the diaphragms.

There should further be provided between both frames 6, 17 and in supporting plate 32, a recess allowing the passage of the pressurized air supply 14 which is required for inflating the diaphragms.

In this embodiment, feeding the material to be filtered occurs through a single inlet 33 for both filtering chambers. The material to be filtered is thus fed tangentially to resilient diaphragms 8 and 10, which minimizes the dead volume in the compartments for material to be filtered 4. The groove formed by the notches 31 is naturally advantageously sealed along the peripheral direction relative to inlet 33, for example, by means of small tight plates 34 which are so shaped as to receive supporting plate 32. A covering 35 may further protect the lower portion of the supporting plate 32 against abrading resulting from feeding the material to be filtered.

Figure 7:
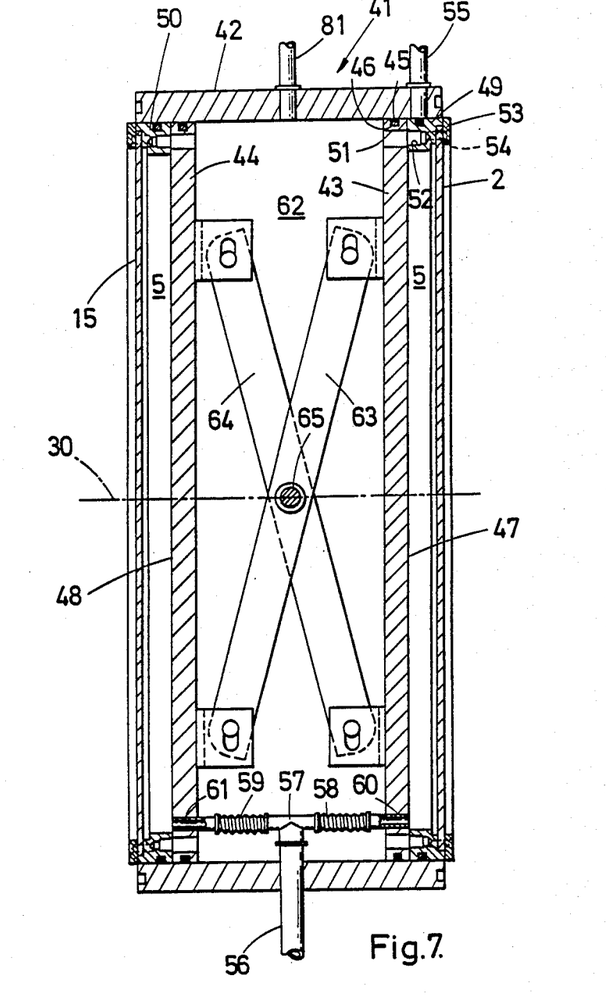
FIG. 7 is an axial section view of a filtering plate in still another embodiment of the device according to the invention.

As appears from FIG. 7, the filtering plate 41 as shown comprises a peripheral frame or module 42 from rigid material which may have any cross-sectional shape, for example a circle or a regular or irregular polygon, as well two front plates 43 and 44. In the example as shown, both front walls 43 and 44 are arranged according to the invention to be axially slidable in peripheral frame 42.

Figure 8:
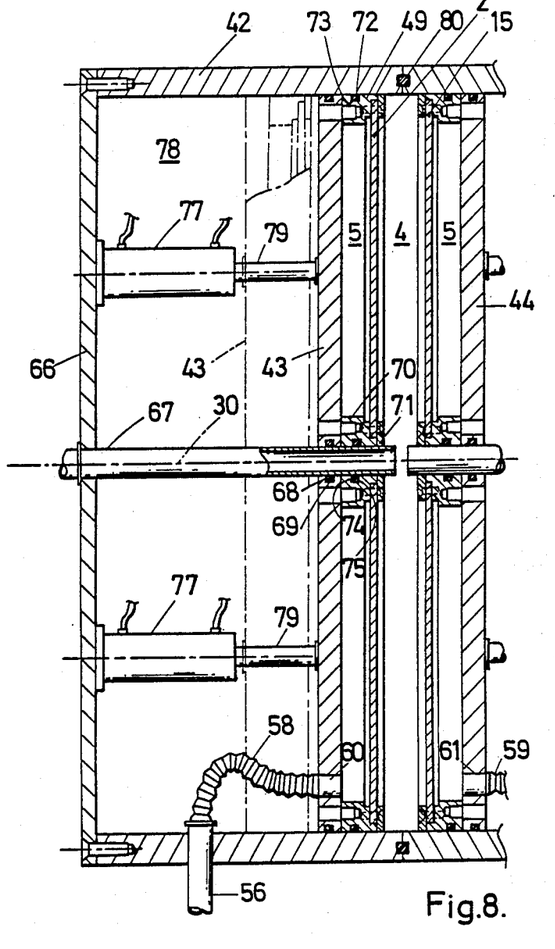
FIG. 8 is a part axial section view of another embodiment of the device according to the invention, during the compressing step.

In the example shown in FIG. 7, each front wall 43, 44 comprises a filtering means in the shape of a perforated plate, a netting or a filtering cloth 2, 15 from rigid material, for example from metal or hard plastic material, the filtering means being adjacent to the compartment for the material to be filtered 4 (see FIG. 8). In the embodiment shown in FIG. 8, the compartment is common to two filtrate-collecting compartments 5. The filtering means 2, 15 is supported on the front plate 43 or 44 respectively thereof, which is arranged on that side of filtering means 2, 15 opposite the corresponding compartment for material to be filtered 4, and which is sealingly slidable in peripheral frame 42. To insure such sealing, a seal joint 45 is for example received in a peripheral groove 46 from support plate 43, 44. In the embodiment shown, the support plates 43 and 44 are arranged in parallel relationship with one another and at right angle to the axis 30 of the filtering chambers. The plates bear the filtering means 2, 15 some distance away from the outer front side 47, 48 thereof, through a spacing ring 49, 50. To secure same to the corresponding support plate, fastening means are provided, for example holes 51 arranged along the peripheral edge of the support plates, corresponding inner threaded bores 52 in the spacing rings 49, 50, and clamping screws, not shown cooperating with the threaded bores 52 through the holes 51. The filtering means 2, 15 are clamped between a spacing ring 49, 50 and an outer clamping ring 53, which is secured to the spacing ring by clamping screws, not shown, cooperating with outer threaded bores 54 in the ring and passing through holes provided along the circumference in clamping ring 53. Each filtering means 2, 15 forms in the example shown in FIGS. 7 to 9, a flat side arranged and retained at right angle to the filtering chamber axis 30.

In the embodiment shown in FIG. 7, feeding the compartment for material to be filtered 4 occurs through a radial feed line 55 which goes through the peripheral frame 42 in a location where it faces the compartment for material to be filtered 4 when the support plate 43 and the filtering means 2 thereof lie recessed inside the filtering plate 41 (as shown in dot-and-dash lines in FIG. 8).

The compartment 5 formed between each rigid filtering means 2, 15 and the support plate 43, 44 thereof serves to collect the filtrate and washing and compressing effluents. The compartment is thus movable here together with the filtering means thereof. In the embodiment shown in FIG. 7, an outlet line 56 passes through the peripheral frame 42 in a location which remains between both the movable support plates 43, 44 even in the retracted position thereof. The line 56 is connected through a T-junction 57 and two extensible lines 58 and 59, for example helix-shaped hoses, concertina-like pipes or similar, to passageways 60 and 61 provided through support plates 43 and 44. The passageways thus connect the collecting compartments 5 to the outlet line 56 and allow discharging the washing effluents and the filtrate from the filter-press.

In the embodiment shown in FIG. 7, the means allowing the filtering means 2, 15 to move are comprised of a power source, not shown, in this case a pressurized air source which communicates with the pressure chamber 62 formed between the support plates 43, 44 and the peripheral frame 42, through one or a plurality of pressurized air inlet and/or outlet channels 81, which are so arranged as to always open up in the chamber 62 even in the retracted position of support plates 43 and 44. By varying the pressure inside chamber 62, it is thus possible to spread or bring closer the support plates 43 and 44. Stop means not shown may possibly be provided to limit the axial sliding movement of support plates 43 and 44 between an end retracted position and an end opposite position.

Inside chamber 62 guide means are also provided for support plates 43 and 44, which insure an accurate traversing movement, particularly of the filtering means 2 and 15 thereof, along filtering chamber axis 30. The guide means as shown in FIG. 7 are comprised of rods 63, 64 hinged in cross-shape in the center thereof, on a hinge axis 65 at right angle to axis 30 and which is secured to peripheral frame 42. The rods 63, 64 are each hinged to both support plates 43 and 44 with the ends thereof.

There is shown in FIG. 8 an embodiment of the filtering device according to the invention as shown in FIG. 7. The left-hand filtering plate does comprise but one movable filtering means 2, while on the other side, a front wall 66 is fixedly joined to peripheral frame 42, for example by bolting. Such a filtering plate may serve as shown in FIG. 8, as end plate in an arrangement where other filter plates from the filter-press comprise two movable filtering means, or there might also be provided a filter plate arrangement as shown on the left in FIG. 8, in such a way that each compartment for material to be filtered 4 be comprised of a movable filtering means 2 and a fixed front wall 66.

In FIG. 8, the filter plates have a central feed. The feeding to the comparments for material to be filtered 4 occurs through an axial feed line 67 which serves simultaneously to guide the supporting plates 43, 44. The tightness of the support plate 43 relative to the peripheral surface of line 67 is obtained with a ring-like seal 68 received in an inner circumferential groove 69 from the central opening provided in the supporting plate 43 to let line 67 through. In the center, a second spacing ring 70 is secured to the supporting plate 43, by fasteners identical to the ones described for the first spacer ring. The filtering means 2 also has a center opening to let spacer ring 70 through, and it is clamped between the second spacer ring 70 and a second clamping ring 71 by fasteners identical to the ones described for the first clamping ring 53.

The spacer ring 49 advantageously has also a sealing joint 72 received in an outer peripheral groove 73, and the spacer ring 70 a sealing joint 74 received in an inner circumferential groove 75.

In the embodiment of filtering plate as shown on the left in FIG. 8, the feed line 67 is secured to the fixed front wall 66 and the mouth thereof in the compartment for material to be filtered 4 lies slightly on this side of that plate formed by the front edge 76 (see FIG. 9) of peripheral frame 42, to leave a passage for the material being fed, between the ends of said feed lines 67 from both assembled filtering plates.

As it may be seen in FIG. 8, the means for moving the filtering means are here comprised of a power source, in the present case a hydraulic power source, not shown, and one or a plurality of jacks 77 arranged in that chamber 78 formed by the support plate 43 and the fixed wall 66 and the peripheral frame 42. The jacks fed with hydraulic fluid originating from the source, not shown, act on the back of support plate 43 to cause same to move forward or backward in such a way that the filtering means moves with a traversing motion along axis 30 and in a plane at right angle thereto.

Figure 9:
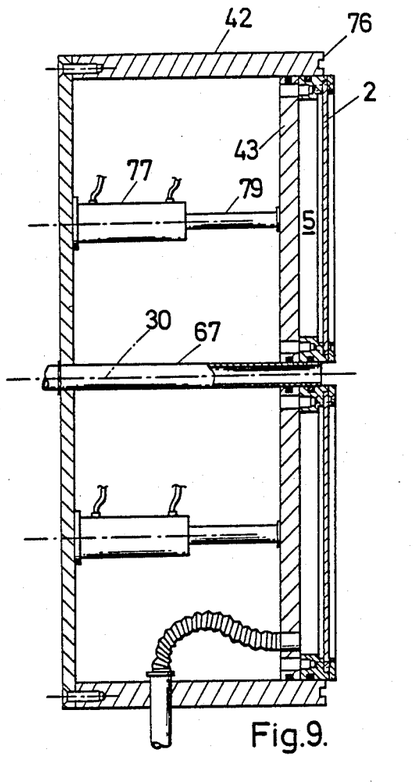
FIG. 9 is a part axial section view corresponding to FIG. 8, during a filter cake discharging step.

The working of the filtering device as shown in FIGS. 8 and 9 is as follows.

In the position as shown in dot-and-dash lines, the front wall 43 lies in the end retracted position, due to retracting of the piston rods 79 from jacks 77. The position is the starting position, wherein the filtering plates are assembled. Assembling is made sealingly between the filtering plates through a ring-like joint 80 pressed between both front edges 76 of the plates. The material to be filtered is fed to each compartment for material to be filtered 4 through the feed line, in the present case the axial line 67.

After filling the compartments with material to be filtered 4, a pre-compressing may possibly occur before washing, by reducing the filtering chamber volume with a movement of the supporting plates 43, 44 from the filtering means towards one another. The liquid phase, that is the filtrate, flows through filtering means 2, 15 and is collected in the collecting compartments 5 wherefrom it is discharged through passageways 60, 61, extensible pipes 59, 58 and outlet line 56.

Washing water is then fed to the compartment for material to be filtered 4, either through feed line 67 itself, or through separate lines, not shown, opening up inside the collecting compartments 5. The washing solute is discharged in the same way as the filtrate.

The final pressing may then occur by moving the filtering means to the position as shown in FIG. 8, that is slightly retracted inside the filtering plates. The compartments for material to be filtered 4 are then reduced to that minimum volume as allowed by the solid phase.

The working of the filtering plate as shown in FIG. 7 is essentially the same, apart from radial feeding of the material to be filtered and using pneumatic moving means.

Dismantling the filter-press is then performed. The filtering plates are thus released from one another and at this moment the filter cake may fall, partly at least, for example in a hopper not shown. To insure complete removal of the filter cake, the filtering means 2, 15 are brought forward to the end position thereof, for example as shown in FIG. 9, where they are stopped beyond that plane as formed by the front edge 76 of peripheral frame 42. There might also be provided for limiting the end position of the filtering means to said plane, as shown in FIG. 7.

As it is noticeable, during all the movements of the filtering means and in every position thereof, the means are retained in one and the same relative position to filtering chamber axis 30, and in a plane at right angle thereto. There results therefrom a compressing of the material to be filtered which is uniform over the whole cross-section of the filtering chambers and during the complete period of the pressing and possibly pre-pressing, which results in a more efficient filtering.

The arrangement as shown in FIG. 7 to 9 also allows using rigid filtering means in the shape of thin perforated plates, which are particularly smooth on the side thereof facing the filtering chamber. Not only the filtering means are much more resistant to ageing than the flexible filtering means presently being used, but they do also allow easy discharging by gravity of the resulting filter cake, particularly when they are driven outside the filtering plates thereof.

It must be understood that the invention is in no way limited to the above embodiments and that many changes may be brought thereto without departing from the scope of the invention as defined by the appended claims.

It might be possible for instance to provide in the embodiments as shown in FIGS. 1 to 4, an arrangement wherein the frames 9 and 11 would be identical and would each bear on the one side a diaphragm 8, and would be provided on the other side with a grooved partition 12, which would allow arranging all the filtering chambers along the same direction.

There might also be provided for arranging the chambers along a vertical axis. The cake would then be collected by gravity on diaphgram 8 when dismantling, to be then discharged by scraping, for example. There might also be considered moving sidewise the frame 6 taking along the filter cake and letting the cake fall by gravity beside the filter-press.

There could also be considered a single discharge from adjacent chambers, for example, by dispensing with separating partition 12.

There might also finally be provided as known per se, a general manifold for all the filtering chambers.

There might also be considered in devices as shown in FIGS. 1 to 4 other means for reducing the volume of the compartment for the material to be filtered, than flexible diaphragms. The arrangement of front plates slidingly movable towards the filtering means with a similar arrangement to the sliding of support plates 43 and 44 in FIGS. 7 to 9 might for example be considered.

In the embodiments as shown in FIGS. 7 to 9, other means might for example be considered for moving the filtering means, for instance electric, electro-magnetic and similar motors.

There might further be considered having the plates 43 and 44 fixed, for example in the position thereof as shown in dot-and-dash lines in FIG. 8. The filtering element 2, 15 only would be suitably moved in the direction of the compartment for material to be filtered 4 by causing simultaneously an increase in the volume of the collecting compartment 5.

There might also be considered that the filtering means 2, 15 have a filtering action but over a portion of the surface area thereof, for example to increase the rigidity thereof.

There might also be provided other undistortable filtering means than the one shown in FIG. 5. There might be considered using sieves, cloths or perforated metal plates for example.

Finally the brewery area is not the only field of application for the invention and it is clear that any technical field making use of filter-presses is concerned.

We claim:

1. In a filter press-type filtering apparatus for removing liquid from a fermentable brewery wort and compressing said fermentable brewery wort into a cake, said apparatus including:
    frame means which defines a hollow interior of a filter chamber having a central axis,
    a filter means which is positioned within said frame means and extends across said hollow interior perpendicularly to said central axis,
    first wall means which is movable within said hollow interior towards and away from said filter means, said first wall means and said filter means forming within said hollow interior a first compartment that can contain said brewery wort,
    inlet means for supplying said brewery wort or a washing liquid to said first compartment,
    second wall means which, together with said filter means, forms a second compartment within said hollow interior that can contain liquid filtered from said first compartment through said filter means,
    outlet means for removing liquid from said second compartment, and
    means for removing the cake formed in said first compartment,
    the improvement wherein said filter means consists of a wire screen against which the brewery wort in said first compartment will come into direct contact, said wire screen comprising a plurality of wires which have flat surfaces which face said first compartment and have tapered configurations as they extend towards said second compartment, said flat surfaces being aligned in an imaginary plane which is substantially perpendicular to said central axis, said flat surfaces being spaced from one another by 50 to 400 microns, said wires not distorting and said flat surfaces thereof remaining essentially in said imaginary plane when said first wall means forces brewery wort in said first compartment against said wires to form said cake.

2. A filter press-type filtering apparatus as defined in claim 1, wherein said first means is made of metal.

3. A filter press-type filtering apparatus as defined in claim 1, wherein said inlet means is arranged with its opening into said first compartment in a positon adjacent to said first wall means, in such a manner that said liquid-containing material is supplied tangentially to said first wall means.

4. A filter press-type filtering apparatus as defined in claim 1, wherein said first wall means comprises a first flexible diaphragm.

5. A filter press-type filtering apparatus as defined in clam 4, wherein said frame means comprises a first frame element having opposite first and second faces and to which said inlet meas is connected; a second frame element having opposite first and second faces, said first face of said second frame element being positionable adjacent the second face of said first frame element, said first flexible diaphragm being positioned between the second face of said first frame element and the first face of said second frame element; and a third frame element which has opposite first and second faces and to which said outlet means is connected, said third frame element including a rigid partition therein.

6. A filter press-type filtering apparatus as defined in claim 5, including a second wall means attached to the second face of said second frame element, thus together with said first flexible diaphragm providing a fluid chamber within said second frame means, and a fluid supply line connected to said second frame element to supply fluid to said fluid chamber and thereby move at least said first flexible diaphragm.

7. A filter press-type filtering apparatus as defined in claim 6, wherein said filter means is attached to said third frame element at the second face thereof, thus together with said rigid partition providing a liquid drainage compartment within said third frame element, the second face of said third frame element being positionable against the first face of said first frame element, and wherein said outlet means is connected to said third frame element.

8. A filter press-type filtering apparatus as defined in claim 6, including a fourth frame element positionable between the second face of said third frame element and the first face of said first frame element, wherein said filter means is mounted within said fourth frame element, and wherein said outlet means is connected to said third face element.

9. A filter press-type filtering apparatus as defined in claim 5, wherein said second face of said first frame element and the first face of said second frame element include corresponding notches; wherein a rigid support plate is positioned in said corresponding notches; wherein said first flexible diaphragm is sealingly connected to the periphery of said rigid support plate on a face thereof facing towards the first face of said first frame element, thus providing a fluid chamber between said first flexible diaphragm and said rigid support plate; wherein a fluid line extends through said rigid support plate to supply fluid to said fluid chamber and thereby move said first flexible diaphragm, and wherein said inlet means communicates with first frame element to supply said brewery wort or washing liquid to said first compartment and tangentially of said first flexible diaphragm.

10. A filter press-type filtering apparatus as defined in claim 4, wherein said frame means comprises a frame element having opposite first and second faces, wherein said first wall means is attached to the first face of said frame element, wherein a second flexible diaphragm is attached to the second face of said frame element, said frame element and said first and second flexible diaphragms forming a fluid chamber supplied by means of a fluid supply line connected to said frame element, and wherein a partition is located in said fluid chamber to prevent said fiaphragms from flapping and to supply fluid simultaneously throughout said fluid chamber.

11. A filter press-type filtering apparatus as defined in claim 1, wherein said second wall means comprises a rigid partition between said hollow interior and the hollow interior of an adjacent filter chamber.

12. A filter press-type filtering apparatus as defined in claim 1, wherein said plurality of wires extend in parallel.

13. A filter press-filtering apparatus as defined in claim 12, wherein said plurality of wires have rear surfaces opposite said flat surfaces, and wherein said wire screen includes a plurality of cross lines which are connected to the rear surfaces of said plurality of wires.

* * * * *